(12) United States Patent
Li et al.

(10) Patent No.: US 10,133,476 B2
(45) Date of Patent: *Nov. 20, 2018

(54) METHOD FOR CONTROLLING SCREEN OF USER TERMINAL AND USER TERMINAL

(71) Applicant: Guangdong Oppo Mobile Telecommunications Corp., Ltd., Dongguan, Guangdong (CN)

(72) Inventors: Jianlin Li, Guangdong (CN); Yuanqing Zeng, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,720

(22) Filed: Sep. 20, 2017

(65) Prior Publication Data

US 2018/0011617 A1    Jan. 11, 2018

Related U.S. Application Data

(63) Continuation of application No. 15/631,750, filed on Jun. 23, 2017, which is a continuation of application No. PCT/CN2016/080428, filed on Apr. 27, 2016.

(30) Foreign Application Priority Data

Aug. 27, 2015  (CN) .......................... 2015 1 0543227

(51) Int. Cl.
*G06F 3/0488* (2013.01)
*G06F 3/041* (2006.01)
*G06F 3/0484* (2013.01)
*G06F 1/32* (2006.01)

(52) U.S. Cl.
CPC .......... *G06F 3/0488* (2013.01); *G06F 1/3212* (2013.01); *G06F 3/0412* (2013.01); *G06F 3/0416* (2013.01); *G06F 3/0484* (2013.01); *G06F 3/04847* (2013.01); *G06F 3/04883* (2013.01)

(58) Field of Classification Search
CPC .... G06F 3/0488; G06F 3/0412; G06F 3/0416; G06F 3/0484; G06F 3/04847; G06F 3/04883; G06F 1/3212
See application file for complete search history.

(56) References Cited

U.S. PATENT DOCUMENTS

2013/0293467 A1*  11/2013  Norden ................. G06F 3/0488
                                                               345/158
2014/0223388 A1    8/2014  Kim et al.
2016/0188181 A1*  6/2016   Smith ..................... G06F 3/048
                                                               715/765

FOREIGN PATENT DOCUMENTS

| CN | 1856209 A   | 11/2006 |
|----|-------------|---------|
| CN | 102314290 A | 1/2012  |
| CN | 102402364 A | 4/2012  |
| CN | 102479040 A | 5/2012  |

(Continued)

*Primary Examiner* — Stephen G Sherman
(74) *Attorney, Agent, or Firm* — Young Basile Hanlon & MacFarlane, P.C.

(57) ABSTRACT

A method for controlling a screen of a user terminal includes the follows. A touch operation on a screen is detected in a black screen state. When a preset condition is met, the screen is controlled to switch from the black screen state to a bright screen state in which the screen brightness is the target brightness value. A user terminal is also provided.

6 Claims, 9 Drawing Sheets

(56) References Cited

FOREIGN PATENT DOCUMENTS

| | | | |
|---|---|---|---|
| CN | 102830905 | A | 12/2012 |
| CN | 102869076 | A | 1/2013 |
| CN | 103294362 | A | 9/2013 |
| CN | 103401970 | A | 11/2013 |
| CN | 103823632 | A | 5/2014 |
| CN | 104010079 | A | 8/2014 |
| CN | 104252258 | A | 12/2014 |
| CN | 104484043 | A | 4/2015 |
| CN | 104506730 | A | 4/2015 |
| CN | 104636065 | A | 5/2015 |
| CN | 104714741 | A | 6/2015 |
| CN | 104749945 | A | 7/2015 |
| CN | 105159590 | A | 12/2015 |

* cited by examiner

METHOD FOR CONTROLLING SCREEN OF USER TERMINAL AND USER TERMINAL

CROSS-REFERENCE TO RELATED APPLICATION(S)

This application is a continuation of U.S. application Ser. No. 15/631,750, filed on Jun. 23, 2017, which is a continuation of International Application No. PCT/CN2016/080428, filed on Apr. 27, 2016, which claims the priority to Chinese Patent Application No. 201510543227.5, filed on Aug. 27, 2015, the contents of all of which are herein incorporated by reference in their entireties.

TECHNICAL FIELD

The present disclosure relates to the field of intelligent terminals, and particularly to a method for controlling a screen of a user terminal and a user terminal.

BACKGROUND

As user terminals, such as intelligent terminals (e.g., smart phones) and tablets are widely used, users have grown to like to have a variety of entertainment using the intelligent terminals, for example, reading novels, viewing news, browsing Weibo, playing games and the like, on the intelligent terminals. Before having a variety of entertainment, the users often need to press a power physical key on the user terminal to light the screen.

However, in practice, it is found that the power physical key on the user terminal is often set to be small and located at the edge location of one side of the user terminal. The users need to spend more time finding the location of the power physical key and conduct a press operation to light the screen. When the sensitivity of the power physical key decreases, the users need to press for several times. It can be seen that this manner is more tedious, the operation is complex, and the efficiency of lighting the screen is lower.

BRIEF DESCRIPTION OF THE DRAWINGS

In order to illustrate the technical solutions of the implementations of the present disclosure more clearly, the drawings used in the implementations will be briefly described, it will be apparent that the drawings described in the following are implementations of the present disclosure, and it will be apparent to those skilled in the art that other drawings can be obtained from the drawings without any creative work.

DETAILED DESCRIPTION

Technical solutions of the present disclosure will be described clearly and completely with reference to the accompanying drawings; obviously, implementations described are merely part of rather than all of the implementations of the present disclosure. Based on the implementations of the present disclosure, other implementations obtained therefrom without any creative work by those of ordinary skill in the art shall fall within the protection scope of the present disclosure.

According to implementations of the present disclosure, there is provided a method for controlling a screen of a user terminal and a user terminal, so as to improve the efficiency of controlling the lighting of the screen. The implementations of the present disclosure will be introduced respectively in detail below.

In the implementations of the present disclosure, a user terminal can include but not limited to an intelligent phone, a laptop, a PC (personal computer), a PDA (personal digital assistant), a MID (mobile internet device), an intelligent wearable device (such as an intelligent watch and an intelligent bracelet). The operating system of the user terminal can include but not limited to any mobile operating system, such as an Android operating system, or any other mobile operating system, and the present disclosure is not limited thereto.

According to an implementation of the present disclosure, there is provided a method for controlling a screen of a user terminal, in which the user terminal detects a touch operation on a screen in a black screen state, then controls the screen to switch from the black screen state to a bright screen state, when a preset condition is met. The method for controlling a screen of a user terminal provided in implementations of the present disclosure will be described in detail with reference to FIG. 1 to FIG. 4.

Figure 1:
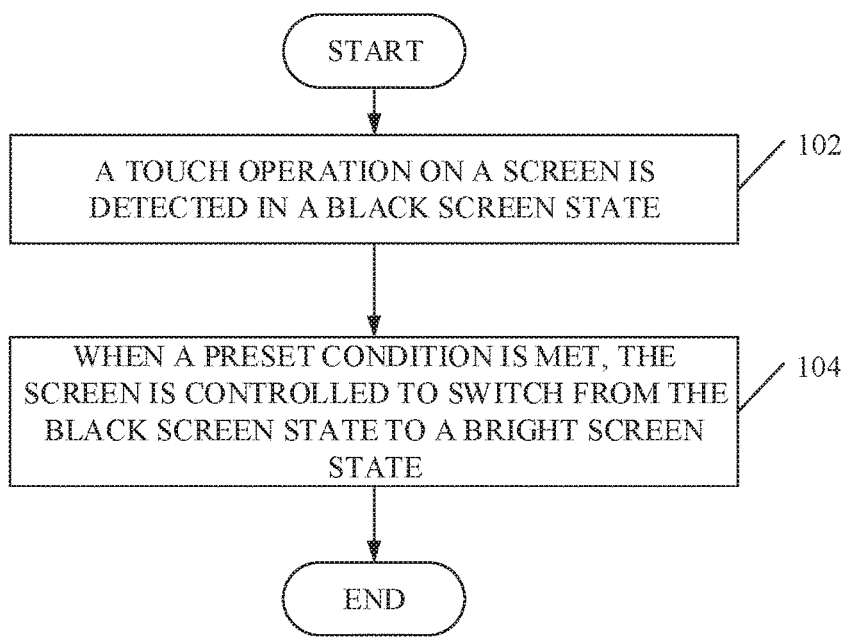
FIG. 1 is a schematic flow diagram illustrating a method for controlling a screen of a user terminal of a first method implementation of the present disclosure.

Referring to FIG. 1, FIG. 1 is a schematic flow diagram illustrating a method for controlling a screen of a user terminal of a first method implementation of the present disclosure. As illustrated in FIG. 1, the method for controlling a screen of a user terminal can begin at block 102.

At block 102, a touch operation on a screen is detected in a black screen state.

In the implementation of the present disclosure, in the black screen state, a user terminal can detect the touch operation of a user touching the screen. The user touching the screen can be single-point touching or multi-point touching, the touching location can be any location on the screen, and the present disclosure is not limited thereto.

At block 104, when a preset condition is met, the screen is controlled to switch from the black screen state to a bright screen state.

Preset Condition 1

In the implementation of the present disclosure, the preset condition 1 can be as follows: a location of a touch point of the touch operation belongs to a preset area, a duration of the touch operation is greater than a preset duration, and touch strength of the touch operation falls within a preset strength range.

In the implementation of the present disclosure, it is judged that whether or not a location of a touch point of the touch operation belongs to a preset area. If YES, proceed to judge whether or not a duration of the touch operation is greater than a preset duration and whether or not touch strength of the touch operation falls within a preset strength range; otherwise, the process ends.

In the implementation of the present disclosure, since the location that the user touches the screen can be any location on the screen, after detecting the touch operation on the screen, the user terminal can judge whether or not the location of the touch point of the touch operation belongs to the preset area, so as to avoid a misoperation. The preset area can be any area on the screen, the area of the preset area can be any area that is smaller than the area of the screen.

When it is judged that the location of the touch point of the touch operation belongs to the preset area, it can be further judged whether or not a duration of the touch operation is greater than a preset duration and whether or not touch strength of the touch operation falls within a preset strength range.

In the implementation of the present disclosure, when the user touches the screen, efforts will be applied to the screen. The user terminal can measure the intensity of the touch strength via a built-in pressure sensor.

When the user terminal judges that the location of the touch point of the touch operation belongs to the preset area, the user terminal can judge whether or not the duration of the touch operation is greater than the preset duration and whether or not the touch strength of the touch operation falls within the preset strength range. The preset duration can be a default duration set by a system or can be a customized duration set by the user; the present disclosure is not limited thereto. The user can preset the preset strength range, for example, the preset strength can be ranged from A to B (A, B).

In some possible implementations, the user terminal can judge whether or not the duration of the touch operation is greater than the preset duration and judge whether or not the touch strength of the touch operation falls within the preset strength range simultaneously; or the user terminal can first judge whether or not the duration of the touch operation is greater than the preset duration, if YSE, proceeds to judge whether or not the touch strength of the touch operation falls within the preset strength range, otherwise, the user terminal does not need to judge whether or not the touch strength of the touch operation falls within the preset strength range; or the user terminal can first judge whether or not the touch strength of the touch operation falls within the preset strength range, if YSE, proceed to judge whether or not the duration of the touch operation is greater than the preset duration, otherwise, the user terminal does not need to judge whether or not the duration of the touch operation is greater than the preset duration.

In the implementation of the present disclosure, when the user terminal judges that the duration of the touch operation is greater than the preset duration and the touch strength of the touch operation falls within the preset strength range, the user terminal can control the screen to switch from the black screen state to the bright screen state.

In some implementations, after the user terminal judges that the duration of the touch operation is greater than the preset duration and the touch strength of the touch operation falls within the preset strength range, the user terminal can first determine target brightness of the lighting screen (that is, turned on), and then control the screen to switch from the black screen state to a bright screen state in which the screen brightness is the target brightness.

Operations of block 102-block 104 can be repeated for multiple times according to actual needs and/or application scenarios.

As can be seen from the implementation described above, in the black screen state, the user terminal detects the touch operation on the screen and can control the screen to switch from the black screen state to the bright screen state when the preset condition is met. As can be seen, by means of the implementation of the present disclosure, the user terminal can determine whether or not it is needed to control the screen to switch from the black screen state to the bright screen state according to touch information (at least one of touch location, touch event, and touch strength) of the touch operation of the user. There is no need for users to spend more time finding a power button and press the power button for several times, thus can improve the efficiency of controlling the lighting of the screen.

As can be seen from the method for controlling a screen of a user terminal illustrated in FIG. 1, when a preset condition is met, the screen can be controlled to switch from the black screen state to a bright screen state, specifically, the screen can be controlled to switch from the black screen state to a bright screen state in which the screen brightness is the target brightness value. There can be a plurality of manners in which the user terminal inquires the target brightness value, which will be described in detail with reference to FIG. 2-FIG. 4.

Figure 2:
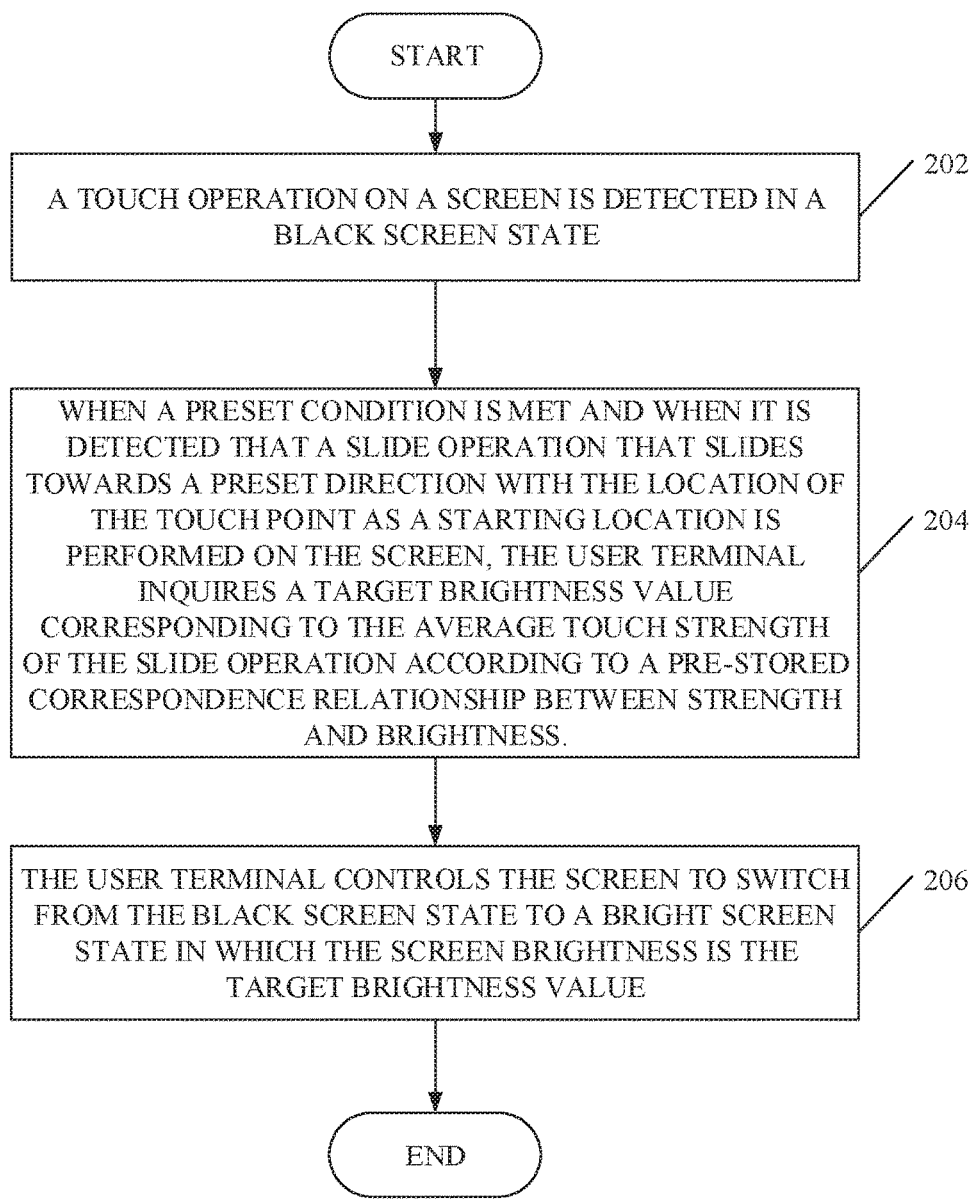
FIG. 2 is a schematic flow diagram illustrating another method for controlling a screen of a user terminal of a second method implementation of the present disclosure.

Referring to FIG. 2, FIG. 2 is a schematic flow diagram illustrating another method for controlling a screen of a user terminal of a second method implementation of the present disclosure. The method of FIG. 2 describes the implementation of a target brightness value inquiring operation and a screen switching operation in detail on the basis of FIG. 1. As illustrated in FIG. 2, the method can begin at block 202.

At block 202, in a black screen state, a user terminal detects a touch operation on a screen.

During implementation, the process that the user terminal detects the touch operation on the screen in the black screen state can refer to the description of block 102 of the first method implementation and it will not be repeated here.

At block 204, when a preset condition is met and when it is detected that a slide operation that slides towards a preset direction with the location of the touch point as a starting location is performed on the screen, the user terminal inquires a target brightness value corresponding to the average touch strength of the slide operation according to a pre-stored correspondence relationship between strength and brightness.

In this implementation, the preset condition can be as follows: a location of a touch point of the touch operation belongs to a preset area, a duration of the touch operation is greater than a preset duration, and touch strength of the touch operation falls within a preset strength range.

Specifically, the user terminal judges whether or not a location of a touch point of the touch operation belongs to a preset area. If YES, proceed to judge whether or not a duration of the touch operation is greater than a preset duration and whether or not a touch strength of the touch operation falls within a preset strength range; otherwise, the process ends.

When the duration of the touch operation is greater than the preset duration and the touch strength of the touch operation falls within the preset strength range, the user terminal judges whether or not a slide operation that slides towards a preset direction with the location of the touch point as a starting location is performed on the screen. If YES, proceed to the block 204; otherwise, the process ends.

In the implementation of the present disclosure, after the user touches the screen, the user can perform a slide operation on the screen with a finger(s), the slide operation can slide towards any direction with the location of the touch point as a starting location, for example, the sliding direction may be towards the left, towards the right, upwards, downwards, and the like.

When the user terminal judges that the duration of the touch operation is greater than the preset duration and the touch strength of the touch operation falls within the preset strength range, the user terminal can further detect whether or not the slide operation that slides towards the preset direction with the location of the touch point as the starting location is performed on the screen. If YES, the user terminal can detect and obtain the touch strength in real-time during sliding, and calculate the average touch strength. The preset direction can be a customized direction set by the user or a default direction set by a system, for example, downwards.

In the implementation of the present disclosure, the user terminal can obtain the correspondence relationship between strength and brightness in advance through experiments, and store the correspondence relationship in the user terminal. After the user terminal determines the average touch strength, the user terminal can inquire the target brightness value corresponding to the average touch strength of the slide operation according to the pre-stored correspondence relationship between strength and brightness.

At block 206, the user terminal controls the screen to switch from the black screen state to a bright screen state in which the screen brightness is the target brightness value.

In the implementation of the present disclosure, after the user terminal inquires the target brightness value corresponding to the average touch strength of the slide operation, the user terminal can control the screen to switch from the black screen state to the bright screen state in which the screen brightness is the target brightness value rather than a system default brightness value, so as to meet the individual needs of users and improve user experience.

As can be seen from the implementations described above, when the duration of the touch operation is greater than the preset duration, the touch strength of the touch operation falls within the preset strength range, and it is detected that a slide operation that slides towards the preset direction with the location of the touch point as the starting location is performed on the screen, the user terminal can inquire the target brightness value corresponding to the average touch strength of the slide operation according to the pre-stored correspondence relationship between strength and brightness, and control the screen to switch from the black screen state to the bright screen state in which the screen brightness is the target brightness value. As can be seen, by means of the implementation of the present disclosure, the user terminal can determine the screen brightness of the lighting screen according to related slide information of the slide operation of the user on the screen, which can meet the individual needs of users and improve the user experience.

Figure 3:
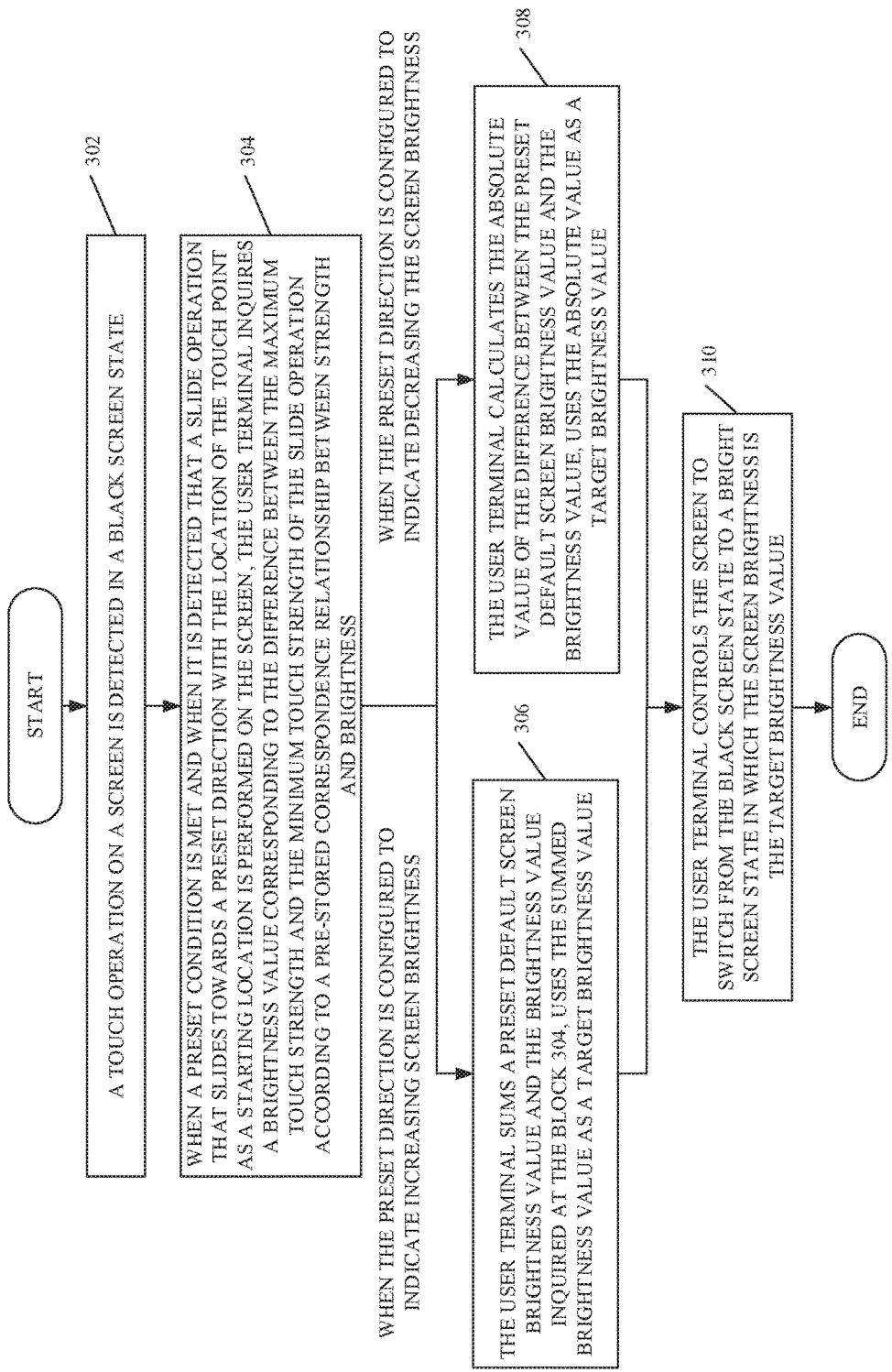
FIG. 3 is a schematic flow diagram illustrating another method for controlling a screen of a user terminal of a third method implementation of the present disclosure.

Referring to FIG. 3, FIG. 3 is a schematic flow diagram illustrating another method for controlling a screen of a user terminal of a third method implementation of the present disclosure. As illustrated in FIG. 3, the method can begin at block 302.

At block 302, in a black screen state, a user terminal detects a touch operation on a screen.

During implementation, the process that the user terminal detects the touch operation on the screen in the black screen state can refer to the description of block 102 of the first method implementation and it will not be repeated here.

At block 304, when a preset condition is met and when it is detected that a slide operation that slides towards a preset direction with the location of the touch point as a starting location is performed on the screen, the user terminal inquires a brightness value corresponding to the difference between the maximum touch strength and the minimum touch strength of the slide operation according to a pre-stored correspondence relationship between strength and brightness.

In this implementation, the preset condition can be as follows: a location of a touch point of the touch operation belongs to a preset area, a duration of the touch operation is greater than a preset duration, and touch strength of the touch operation falls within a preset strength range.

Specifically, the user terminal judges whether or not a location of a touch point of the touch operation belongs to a preset area. If YES, proceed to judge whether or not a duration of the touch operation is greater than a preset duration and whether or not touch strength of the touch operation falls within a preset strength range; otherwise, the process ends.

When the duration of the touch operation is greater than the preset duration and the touch strength of the touch operation falls within the preset strength range, the user terminal judges whether or not a slide operation that slides towards a preset direction with the location of the touch point as a starting location is performed on the screen. If YES, proceed to the block 304; otherwise, the process ends.

In the implementation of the present disclosure, after the user touches the screen, the user can perform a slide operation on the screen with a finger(s), the slide operation can slide towards any direction with the location of the touch point as a starting location, for example, the sliding direction may be towards the left, towards the right, upwards, downwards, and the like.

When the user terminal judges that the duration of the touch operation is greater than the preset duration and the touch strength of the touch operation falls within the preset strength range, the user terminal can further detect whether or not the slide operation that slides towards the preset direction with the location of the touch point as the starting location is performed on the screen. If YES, the user terminal can detect and obtain the maximum touch strength and the minimum touch strength in real-time during sliding and calculate the difference between the maximum touch strength and the minimum touch strength.

In the implementation of the present disclosure, the user terminal can obtain the correspondence relationship between strength and brightness in advance through experiments, and store the correspondence relationship in the user terminal. After determining the difference between the maximum touch strength and the minimum touch strength, the user terminal can inquire the brightness value corresponding to the difference between the maximum touch strength and the minimum touch strength of the slide operation according to the pre-stored correspondence relationship between strength and brightness.

In the implementation of the present disclosure, after the user terminal inquires the brightness value corresponding to the difference between the maximum touch strength and the minimum touch strength of the slide operation according to the pre-stored correspondence relationship between strength and brightness, when the preset direction is configured to indicate increasing screen brightness, proceed to block 306; when the preset direction is configured to indicate decreasing the screen brightness, proceed to block 308.

At block 306, when the preset direction is configured to indicate increasing screen brightness, the user terminal sums a preset default screen brightness value and the brightness value inquired at the block 304, uses the summed brightness value as a target brightness value, and proceeds to block 310.

In the implementation of the present disclosure, the user terminal can pre-set operations indicated by different slide directions, for example, sliding upwards can be configured to indicate increasing the screen brightness, sliding downwards can be configured to indicate decreasing the screen brightness; or sliding towards the left can be configured to indicate increasing the screen brightness, sliding towards the right can be configured to indicate decreasing the screen brightness. When detecting a slide towards one direction, the user terminal can first judge whether or not the direction is the preset direction. If YES, the user terminal can further determine a target operation indicated by the direction according to the above-mentioned pre-setting. When the preset direction is configured to indicate increasing the screen brightness, the user terminal can sum the preset default screen brightness value and the inquired brightness value, and use the summed brightness value as the target brightness value. The preset default brightness value of the screen can be a default brightness value set when the user terminal is shipped from a factory, or can be a customized default brightness value set by the user, and the present disclosure is not limited thereto.

In the implementation of the present disclosure, the preset default brightness value of the screen can be a default brightness value when the screen lights up.

At block 308, when the preset direction is configured to indicate decreasing the screen brightness, the user terminal calculates the absolute value of the difference between the preset default screen brightness value and the brightness value, uses the absolute value as a target brightness value, and proceeds to block 310.

In the implementation of the present disclosure, after the user terminal inquires the brightness value corresponding to the difference between the maximum touch strength and the minimum touch strength of the slide operation, and when the preset direction is configured to indicate decreasing the screen brightness, the user terminal can calculate the absolute value of the difference between the preset default screen brightness value and the brightness value, and use the absolute value as the target brightness value.

In the implementation of the present disclosure, the absolute value of the difference between the preset default screen brightness value and the brightness value is smaller than the preset default screen brightness value.

At block 310, the user terminal controls the screen to switch from the black screen state to a bright screen state in which the screen brightness is the target brightness value, and the process ends.

In the implementation of the present disclosure, after the user terminal determines the target brightness value, the user terminal can control the screen to switch from the black screen state to the bright screen state in which the screen brightness is the target brightness value rather than a preset default brightness value, which can meet the individual needs of users and improve the user experience.

As can be seen from the implementations described above, when the duration of the touch operation is greater than the preset duration, the touch strength of the touch operation falls within the preset strength range and it is detected that the slide operation that slides towards the preset direction with the location of the touch point as the starting location is performed on the screen, the user terminal can inquire the brightness value corresponding to the difference between the maximum touch strength and the minimum touch strength of the slide operation according to the pre-stored correspondence relationship between strength and brightness. When the preset direction is configured to indicate increasing the screen brightness, the user terminal sums the preset default screen brightness value and the inquired brightness value, uses the summed brightness value as the target brightness value. When the preset direction is configured to indicate decreasing the screen brightness, the user terminal calculates the absolute value of the difference between the preset default screen brightness value and the brightness value, uses the absolute value as the target brightness value. The user terminal controls the screen to switch from the black screen state to the bright screen state in which the screen brightness is the target brightness value. When the preset direction is configured to indicate decreasing the screen brightness, the user terminal calculates the absolute value of the difference between the preset default screen brightness value and the brightness value, uses the absolute value as the target brightness value, and controls the screen to switch from the black screen state to the bright screen state in which the screen brightness is the target brightness value. As can be seen, by means of the implementation of the present disclosure, the user terminal can determine the screen brightness of the lighting screen according to related slide information of the slide operation of the user on the screen, so as to meet the individual needs of users and improve the user experience.

FIG. 2 to FIG. 3 illustrates the process that the user terminal inquires the target brightness value screen brightness on the basis of a touch strength. Specifically, FIG. 2 illustrates the process that the user terminal inquires the target brightness value screen brightness on the basis of the average touch strength, and FIG. 3 illustrates the process that the user terminal inquires the target brightness value screen brightness on the basis of the difference between the maximum touch strength and the minimum touch strength of the slide operation. The user terminal can also inquire the target brightness value screen brightness on the basis of battery power, which will be described in detail with reference to FIG. 4.

Figure 4:
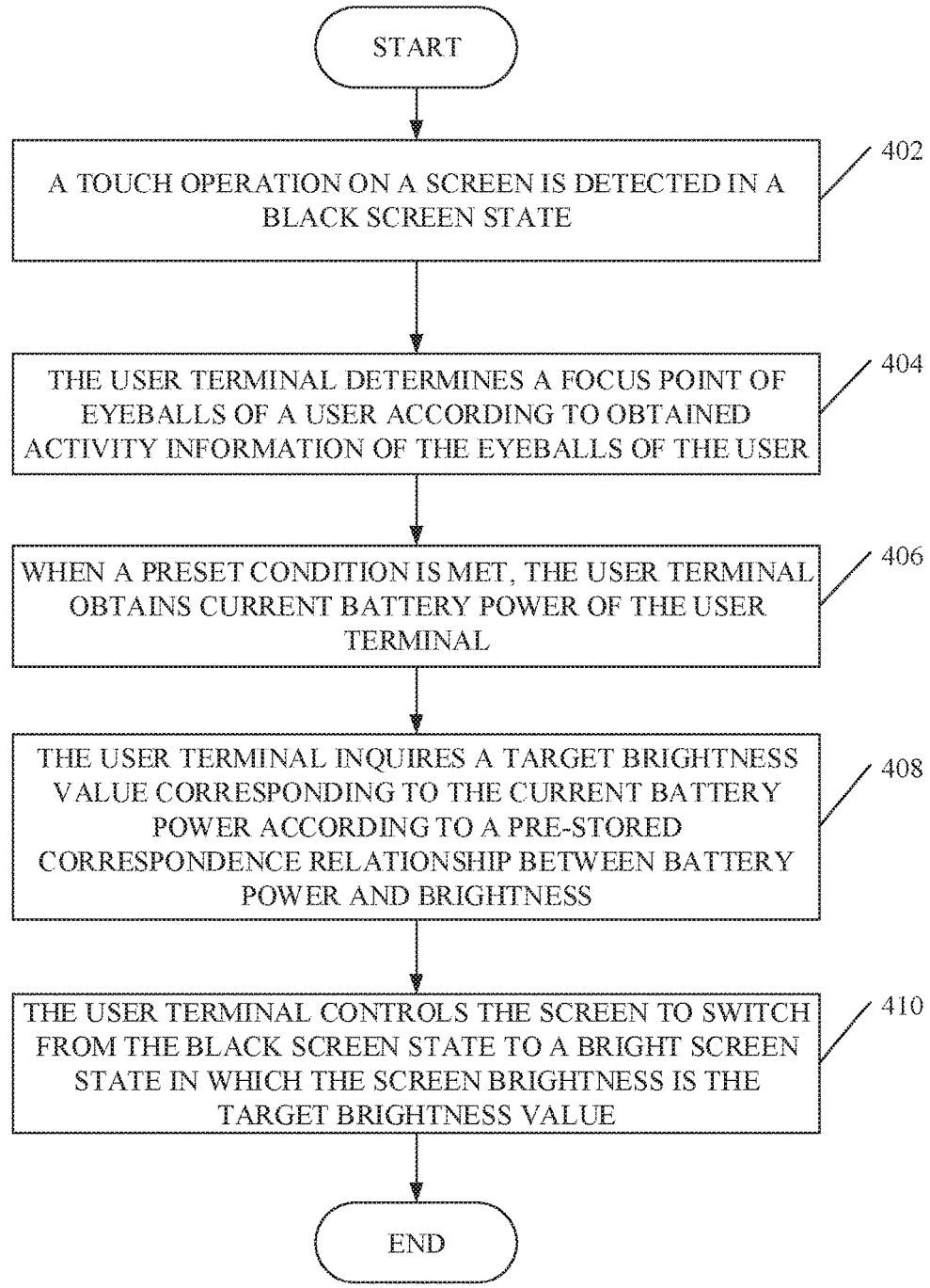
FIG. 4 is a schematic flow diagram illustrating another method for controlling a screen of a user terminal of a fourth method implementation of the present disclosure.

Referring to FIG. 4, FIG. 4 is a schematic flow diagram illustrating another method for controlling a screen of a user terminal of a fourth method implementation of the present disclosure. As illustrated in FIG. 4, the method can begin at block 402.

At block 402, in a black screen state, a user terminal detects a touch operation on a screen.

During implementation, the process that the user terminal detects the touch operation on the screen in the black screen state can refer to the description of block 102 of the first implementation and it will not be repeated here.

At block 404, the user terminal determines a focus point of eyeballs of a user according to obtained activity information of the eyeballs of the user.

In the implementation of the present disclosure, the user terminal can obtain the activity information of the eyeballs of the user by eye-tracking technology, so as to determine a target of the eyeballs, that is, the focus point. Specifically, low-power infrared beam can be configured to irradiate the eyeballs of the user, light reflected from the pupil, the iris, the cornea, or other different parts can be acquired by sensors, and after analysis of a preset algorithm, the target of the eyeballs can be determined.

At block 406, when a preset condition is met, the user terminal obtains current battery power of the user terminal.

Preset Condition 2

In some possible implementations, the preset condition 2 can be as follows: there is on the screen a target point matching with the focus point, a location of a touch point of the touch operation belongs to a preset area, a duration of the touch operation is greater than a preset duration, and touch strength of the touch operation falls within a preset strength range.

In the implementation of the present disclosure, the user terminal judges whether or not there is on the screen a target point matching with the focus point. If YES, proceed to judge whether or not a location of a touch point of the touch operation belongs to a preset area; otherwise, the process ends.

In the implementation of the present disclosure, the manner in which the user terminal judges whether or not there is on the screen the target point matching with the focus point can include the follows.

The user terminal judges whether or not there is on the screen such a point, from which the distance to the focus point is less than or equivalent to a preset distance threshold. If YES, it can be determined that on the screen, there is the target point matching with the focus point.

In the implementation of the present disclosure, when eyes of the user are looking at a distance, the distance from the focus point of the eyeballs of the user to any point on the screen can be larger than the preset distance threshold. At this moment, the user does not pay attention to the screen of the user terminal, that is, touching operation of the user on the screen may be a misoperation. The user terminal does not need to light the screen, so as to save battery power of the user terminal.

When the user terminal judges that the location of the touch point of the touch operation belongs to the preset area, the user terminal can further judge whether or not a duration of the touch operation is greater than a preset duration and whether or not touch strength of the touch operation falls within a preset strength range. When the duration of the touch operation is greater than the preset duration and the touch strength of the touch operation falls within the preset strength range, the user terminal obtains current battery power of the user terminal.

In the implementation of the present disclosure, when the user terminal judges that the duration of the touch operation is greater than the preset duration and the touch strength of the touch operation falls within the preset strength range, the user terminal can obtain the current battery power of the user terminal via a built-in battery detecting unit.

At block 408, the user terminal inquires a target brightness value corresponding to the current battery power according to a pre-stored correspondence relationship between battery power and brightness.

In the implementation of the present disclosure, the higher the screen brightness of the user terminal, the faster the battery power consumption, the shorter the standby time. The user terminal can obtain the correspondence relationship between battery power and brightness in advance through experiments, and store the correspondence relationship in the user terminal. After the user terminal obtains the current battery power of the user terminal, the user terminal can inquire the target brightness value corresponding to the current battery power according to the pre-stored correspondence relationship between battery power and brightness. In the correspondence relationship, the battery power corresponds to the brightness, and each brightness can ensure that a battery power corresponding thereto does not affect the user to watch while maintaining a long standby time. For example, battery power A1 corresponds to brightness B1, and when the battery power of the user terminal is A1, the screen brightness of the user terminal can be adjusted to B1, to avoid affecting the user to watch and maintain a long standby time with the brightness of B1.

At block 410, the user terminal controls the screen to switch from the black screen state to a bright screen state in which the screen brightness is the target brightness value.

In the implementation of the present disclosure, the user terminal can control the screen to switch from the black screen state to the bright screen state in which the screen brightness is the target brightness value, so as to save as much battery power as possible and maintain a long standby time with the screen brightness of the target brightness value.

In the method illustrated in FIG. 4, in the black screen state, after the user terminal detects the touch operation on the screen and the preset condition is met, the user terminal can obtain current battery power of the user terminal, inquire the target brightness value corresponding to the current battery power according to the pre-stored correspondence relationship between battery power and brightness, and control the screen to switch from the black screen state to the bright screen state in which the screen brightness is the target brightness value. As can be seen, by means of the implementation of the present disclosure, the user terminal can determine that the user is watching the screen currently by judging that there is the target point matching with the focus point on the screen, and can further determine the screen brightness of the lighting screen according to the current battery power, so as to save the battery power of the user terminal and meet the individual needs of users.

Apparatus implementations of the present disclosure, which are applicable to execute the methods according to the method implementations of the present disclosure, are provided hereinbelow. To facilitate illustration, only parts relevant to the implementations of the present disclosure are illustrated. Undisclosed specific technical details may be subject to the method implementations of the present disclosure.

Figure 5:
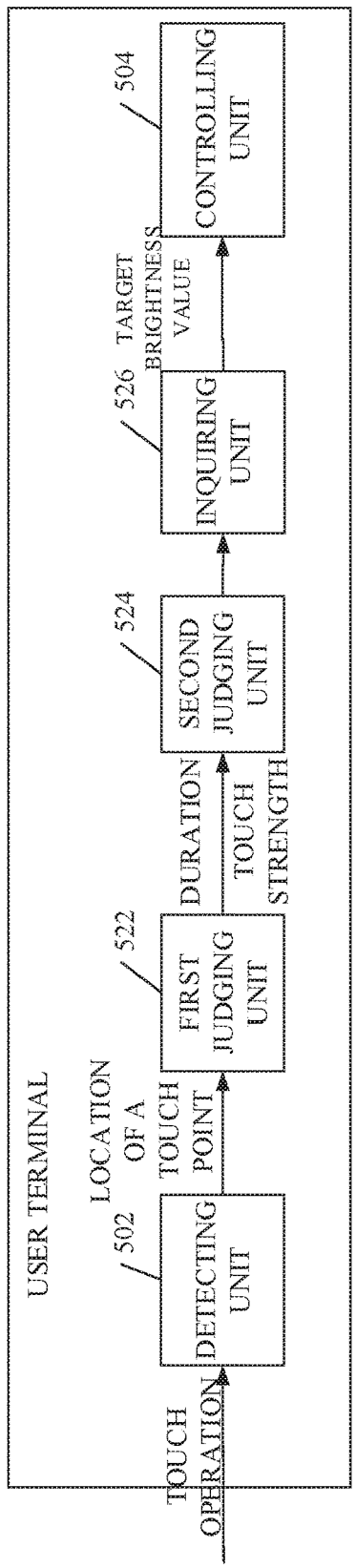
FIG. 5 is a structural schematic diagram illustrating a user terminal of a first apparatus implementation of the present disclosure.

Referring to FIG. 5, FIG. 5 is a structural schematic diagram illustrating a user terminal of a first apparatus implementation of the present disclosure. As illustrated in FIG. 5, the terminal 500 can include a detecting unit 502 (such as a detector or a sensor) and a controlling unit 504 (such as a processor). As one implementation, detecting unit 502 and the controlling unit 504 can be integrated into one element per actual needs.

The detecting unit 502 is configured to detect a touch operation on a screen in a black screen state.

In the implementation of the present disclosure, in the black screen state, the detecting unit 502 can detect the touch operation of a user touching the screen. The user touching the screen can be single-point touching or multi-point touching, the touching location can be any location on the screen, and the present disclosure is not limited thereto.

The controlling unit 504 is configured to control the screen to switch from the black screen state to a bright screen state in which the screen brightness is the target brightness value when a preset condition is met.

Preset Condition 1

In the implementation of the present disclosure, the preset condition 1 can be as follows: a location of a touch point of the touch operation belongs to a preset area, a duration of the touch operation is greater than a preset duration, and touch strength of the touch operation falls within a preset strength range.

The terminal 500 can further include a first judging unit 522 (such as a processor) and a second judging unit 524 (such as a processor).

The first judging unit 522 is configured to judge whether or not a location of a touch point of the touch operation belongs to a preset area.

The second judging unit 524 is configured to judge whether or not a duration of the touch operation is greater than a preset duration and whether or not touch strength of the touch operation falls within a preset strength range, when the first judging unit 522 judges that the location of the touch point of the touch operation belongs to the preset area.

In the implementation of the present disclosure, since the location that the user touches the screen can be any location on the screen, after detecting the touch operation on the screen, it can be judged that whether or not the location of the touch point of the touch operation belongs to the preset area, so as to avoid a misoperation. The preset area can be any area on the screen, the area of the preset area can be any area that is smaller than the area of the screen.

It can be further judged whether or not a duration of the touch operation is greater than a preset duration and whether or not touch strength of the touch operation falls within a preset strength range, when it is judged that the location of the touch point of the touch operation belongs to the preset area.

In the implementation of the present disclosure, when the user touches the screen, efforts will be applied to the screen. The user terminal can measure the intensity of the touch strength via a built-in pressure sensor.

When it is judged that the location of the touch point of the touch operation belongs to the preset area, it can be further judged that whether or not the duration of the touch operation is greater than the preset duration and whether or not the touch strength of the touch operation falls within the preset strength range. The preset duration can be a default duration set by a system or can be a customized duration set by the user; the present disclosure is not limited thereto. The user can preset the preset strength range, for example, the preset strength can be ranged can be from A to B (A, B).

In some possible implementations, the process of judging whether or not the duration of the touch operation is greater than the preset duration and the process of judging whether or not the touch strength of the touch operation falls within the preset strength range can be conducted simultaneously; or the process of judging whether or not the duration of the touch operation is greater than the preset duration can be conducted first, if YSE, proceeds to the process of judging whether or not the touch strength of the touch operation falls within the preset strength range, otherwise, the user terminal does not need to judge whether or not the touch strength of the touch operation falls within the preset strength range; or the process of judging whether or not the touch strength of the touch operation falls within the preset strength range can be conducted first, if YSE, proceed to the process of judging whether or not the duration of the touch operation is greater than the preset duration, otherwise, the user terminal does not need to judge whether or not the duration of the touch operation is greater than the preset duration.

In the implementation of the present disclosure, when a preset condition is met, the controlling unit 504 can control the screen to switch from the black screen state to the bright screen state in which the screen brightness is the target brightness value.

The terminal 500 can further include an inquiring unit 526 (such as a processor).

The inquiring unit 526 (including a first inquiring sub-unit 506 illustrated in FIG. 6) is configured to inquire a target brightness value corresponding to the average touch strength of the slide operation according to a pre-stored correspondence relationship between strength and brightness, when the detecting unit 502 detects that the slide operation that slides towards the preset direction with the location of the touch point as the starting location is performed on the screen.

Figure 7:
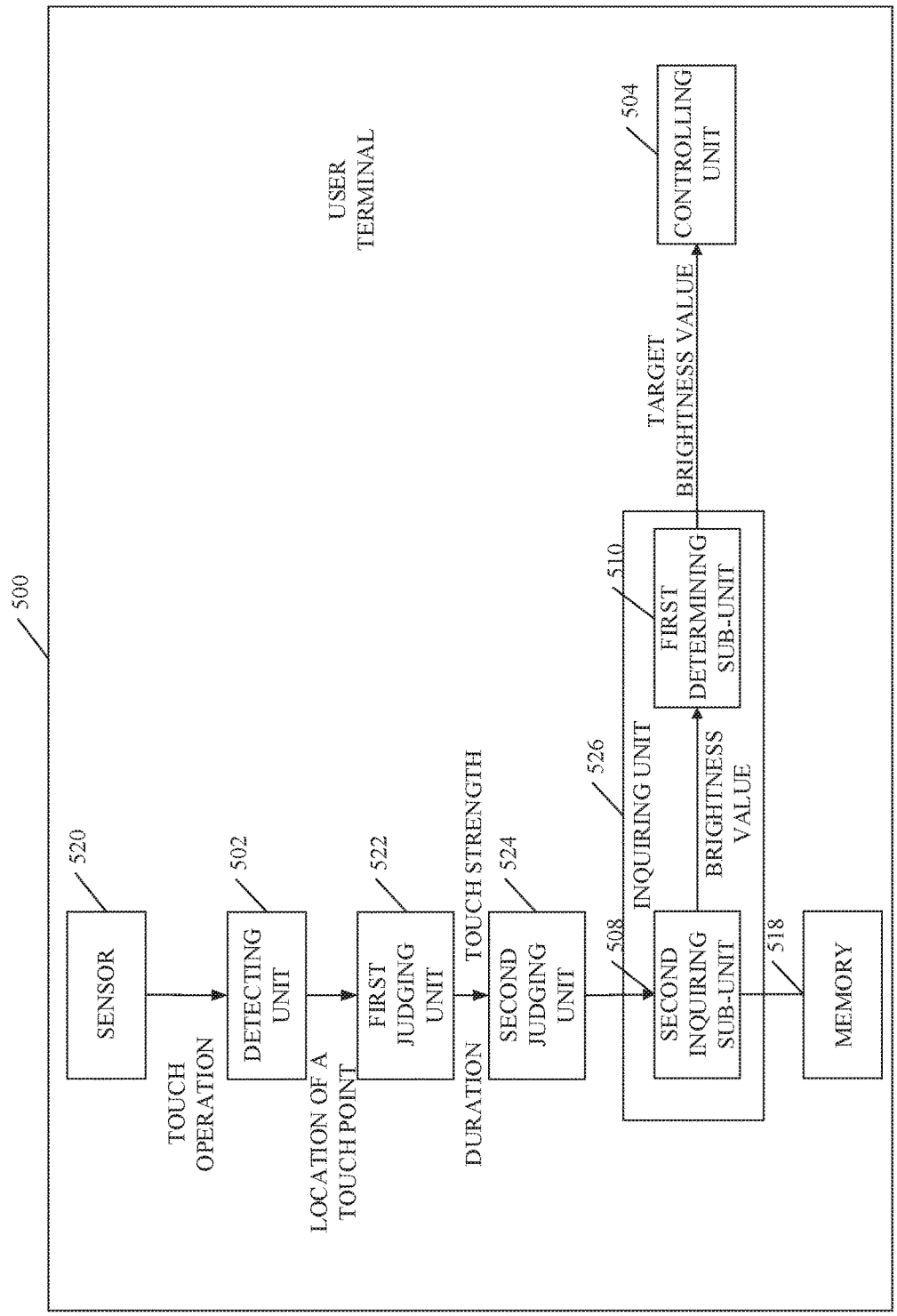
FIG. 7 is a structural schematic diagram illustrating another user terminal of a third apparatus implementation of the present disclosure.

The inquiring unit 526 (including a second inquiring sub-unit 508 and a first determining sub-unit 510 illustrated in FIG. 7) can be configured to inquire a brightness value corresponding to the difference between the maximum touch strength and the minimum touch strength of the slide operation according to a pre-stored correspondence relationship between strength and brightness, sum a preset default screen brightness value and the brightness value, and use the summed brightness value as a target brightness value, when the preset direction is configured to indicate increasing screen brightness as well. The inquiring unit 526 can be configured to calculate the absolute value of the difference between the preset default screen brightness value and the brightness value, and use the absolute value as a target brightness value, when the preset direction is configured to indicate decreasing the screen brightness as well.

Figure 8:
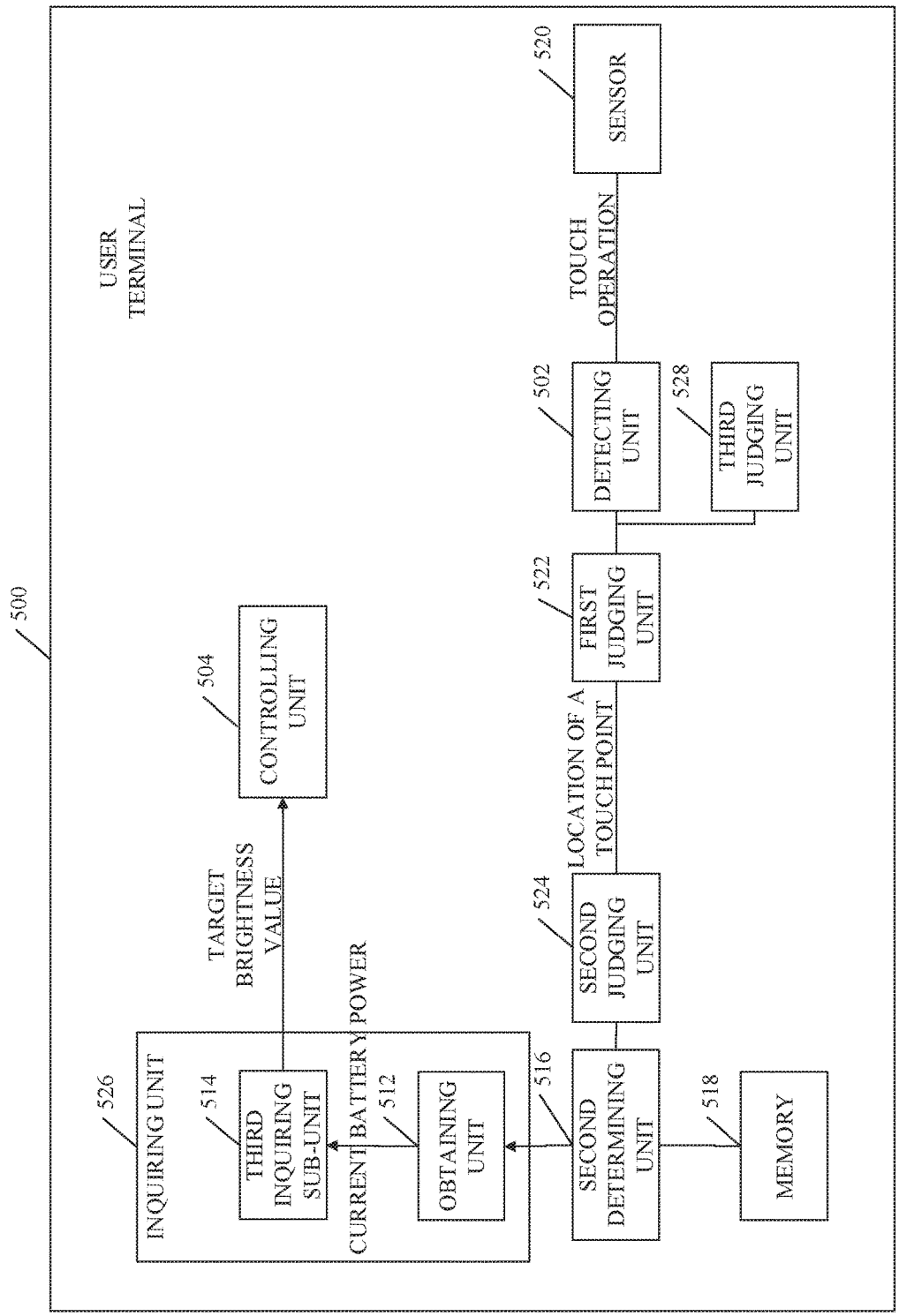
FIG. 8 is a structural schematic diagram illustrating another user terminal of a fourth apparatus implementation of the present disclosure.

The inquiring unit 526 (including an obtaining sub-unit 512 and a third inquiring sub-unit 514 illustrated in FIG. 8) can be configured to obtain current battery power of the user terminal and inquire a target brightness value corresponding to the current battery power according to a pre-stored correspondence relationship between battery power and brightness as well.

Figure 6:
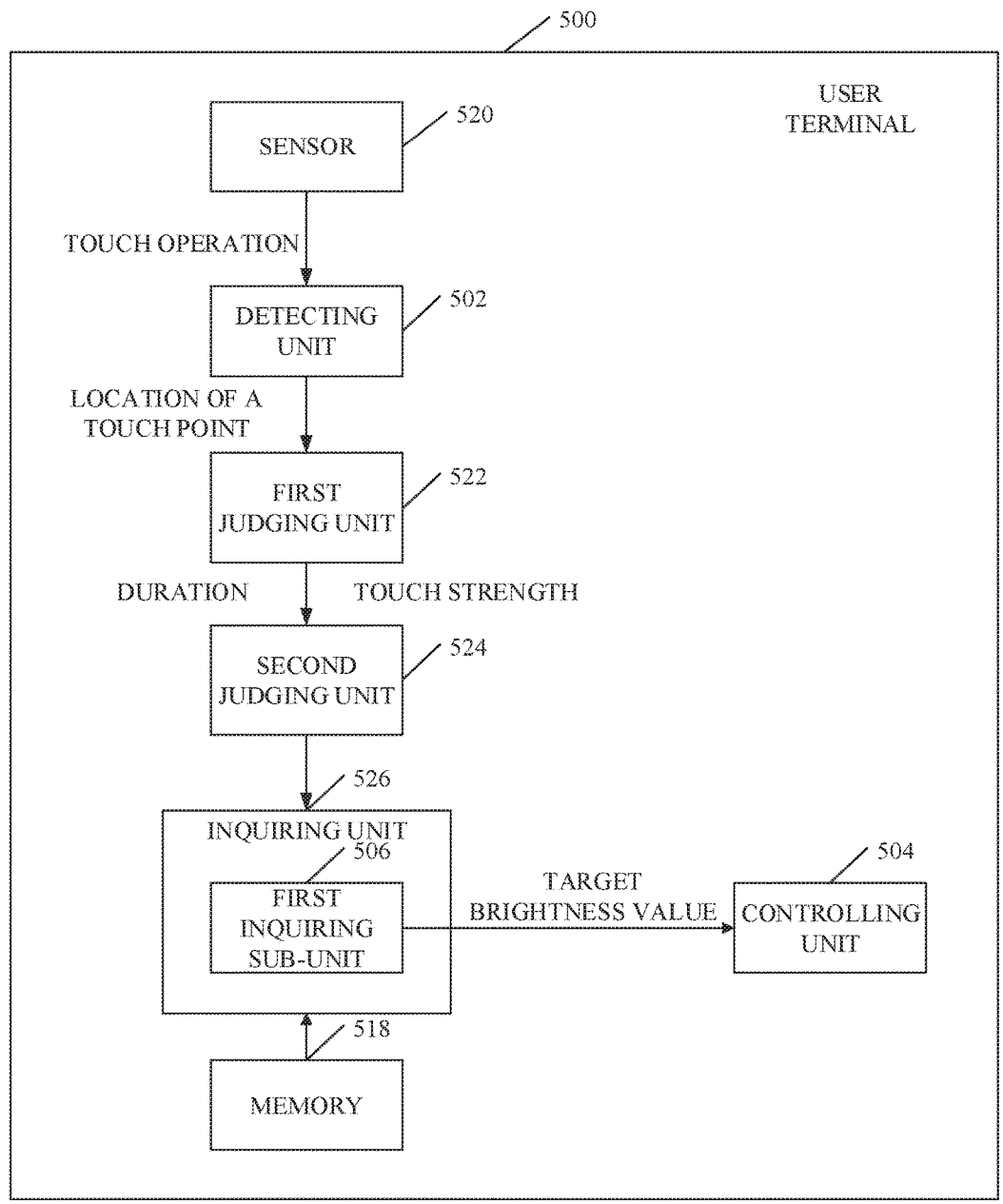
FIG. 6 is a structural schematic diagram illustrating another user terminal of a second apparatus implementation of the present disclosure.

Referring to FIG. 6, FIG. 6 is a structural schematic diagram illustrating another user terminal of a second apparatus implementation of the present disclosure. The user terminal 500 illustrated in FIG. 6 is optimized according to the user terminal illustrated in FIG. 5. Compared with the user terminal illustrated in FIG. 5, the user terminal 500 illustrated in FIG. 6 can include the first inquiring sub-unit 506 (such as a processor) in addition to all units of the user terminal illustrated in FIG. 5. The detecting unit 502, the first judging unit 522, the second judging unit 524, the inquiring unit 526, and the controlling unit 504 have been described with reference to FIG. 5 and will not be repeated here. The preset duration, the preset strength range and a correspondence relationship between strength and brightness can be stored in a memory 518 as illustrated in FIG. 6. The touch operation can be detected by a sensor 520 as illustrated in FIG. 6.

The first inquiring sub-unit 506 is configured to inquire a target brightness value corresponding to the average touch strength of the slide operation according to a pre-stored correspondence relationship between strength and brightness, when the detecting unit 502 detects that the slide operation that slides towards the preset direction with the location of the touch point as the starting location is performed on the screen.

Specifically, the detecting unit 502 is further configured to detect whether or not a slide operation that slides towards a preset direction with the location of the touch point as a starting location is performed on the screen, when it is judged that the duration of the touch operation is greater than the preset duration and the touch strength of the touch operation falls within the preset strength range.

In the implementation of the present disclosure, after the user touches the screen, the user can perform a slide operation on the screen with a finger(s), the slide operation can slide towards any direction with the location of the touch point as a starting location, for example, the sliding direction may be towards the left, towards the right, upwards, downwards, and the like.

When it is judged that the duration of the touch operation is greater than the preset duration and the touch strength of the touch operation falls within the preset strength range, the detecting unit 502 can further detect whether or not the slide operation that slides towards the preset direction with the location of the touch point as the starting location is performed on the screen. If YES, the detecting unit 502 can detect and obtain the touch strength in real-time during sliding, and calculate the average touch strength. The preset direction can be a customized direction set by the user or a default direction set by a system, for example, downwards.

In the implementation of the present disclosure, the user terminal can obtain the correspondence relationship between strength and brightness in advance through experiments, and store the correspondence relationship in the user terminal. After the user terminal determines the average touch strength, the first inquiring sub-unit 506 can inquire the target brightness value corresponding to the average touch strength of the slide operation according to the pre-stored correspondence relationship between strength and brightness.

The controlling unit 504 is further configured to control the screen to switch from the black screen state to a bright screen state in which the screen brightness is the target brightness value.

In the implementation of the present disclosure, after the first inquiring sub-unit 506 inquires the target brightness value corresponding to the average touch strength of the slide operation, the controlling unit 504 can control the screen to switch from the black screen state to the bright screen state in which the screen brightness is the target brightness value rather than a system default brightness value, so as to meet the individual needs of users and improve user experience.

Referring to FIG. 7, FIG. 7 is a structural schematic diagram illustrating another user terminal of an implementation of the present disclosure. The user terminal 500 illustrated in FIG. 7 is optimized according to the user terminal illustrated in FIG. 5. Compared with the user terminal illustrated in FIG. 5, the user terminal illustrated in FIG. 7 can include the second inquiring sub-unit 508 (such as a processor) and the first determining sub-unit 510 (such as a processor) in addition to all units of the user terminal illustrated in FIG. 5. The detecting unit 502 and the controlling unit 504 have been described with reference to FIG. 5 and will not be repeated here. The preset duration, the preset strength range and a correspondence relationship between strength and brightness can be stored in a memory 518 as illustrated in FIG. 7. The touch operation can be detected by a sensor 520 as illustrated in FIG. 7.

The detecting unit 502 is further configured to detect whether or not a slide operation that slides towards a preset direction with the location of the touch point as a starting location is performed on the screen, after it is judged that the duration of the touch operation is greater than the preset duration and the touch strength of the touch operation falls within the preset strength range.

In the implementation of the present disclosure, after the user touches the screen, the user can perform a slide operation on the screen with a finger(s), the slide operation can slide towards any direction with the location of the touch point as a starting location, for example, the sliding direction may be towards the left, towards the right, upwards, downwards, and the like.

When it is judged that the duration of the touch operation is greater than the preset duration and the touch strength of the touch operation falls within the preset strength range, the detecting unit 502 can further detect whether or not the slide operation that slides towards the preset direction with the location of the touch point as a starting location is performed on the screen. If YES, the user terminal can detect and obtain the maximum touch strength and the minimum touch strength in real-time during sliding and calculate the difference between the maximum touch strength and the minimum touch strength.

The second inquiring sub-unit 508 is configured to inquire a brightness value corresponding to the difference between the maximum touch strength and the minimum touch strength of the slide operation according to a pre-stored correspondence relationship between strength and brightness, when the detecting unit 502 detects that the slide operation that slides towards the preset direction with the location of the touch point as the starting location is performed on the screen.

In the implementation of the present disclosure, the user terminal can obtain the correspondence relationship between strength and brightness in advance through experiments, and store the correspondence relationship in the user terminal. After the user terminal determines the difference between the maximum touch strength and the minimum touch strength, the second inquiring sub-unit 508 can inquire the brightness value corresponding to the difference between the maximum touch strength and the minimum touch strength of the slide operation according to the pre-stored correspondence relationship between strength and brightness.

The first determining sub-unit 510 is configured to sum a preset default screen brightness value and the brightness value, and use the summed brightness value as a target brightness value, when the preset direction is configured to indicate increasing screen brightness.

In the implementation of the present disclosure, the user terminal can pre-set operations indicated by different slide directions, for example, sliding upwards can be configured to indicate increasing the screen brightness, sliding downwards can be configured to indicate decreasing the screen brightness; or sliding towards the left can be configured to indicate increasing the screen brightness, sliding towards the right can be configured to indicate decreasing the screen brightness. When detecting a slide towards one direction, the user terminal can first judge whether or not the direction is the preset direction. If YES, the user terminal can further determine a target operation indicated by the direction according to the above-mentioned pre-setting. When the preset direction is configured to indicate increasing the screen brightness, the first determining sub-unit 510 can sum the preset default screen brightness value and the inquired brightness value, and use the summed brightness value as the target brightness value. The preset default brightness value of the screen can be a default brightness value set when the user terminal is shipped from a factory, or can be a customized default brightness value set by the user, and the present disclosure is not limited thereto.

The controlling unit 504 is further configured to control the screen to switch from the black screen state to a bright screen state in which the screen brightness is the target brightness value.

In the implementation of the present disclosure, after the first determining sub-unit 510 determines the target brightness value, the controlling unit 504 can control the screen to switch from the black screen state to the bright screen state in which the screen brightness is the target brightness value rather than a preset default brightness value, so as to meet the individual needs of users and improve user experience.

In some possible implementations, the first determining sub-unit 510 is further configured to calculate the absolute value of the difference between the preset default screen brightness value and the brightness value, and use the absolute value as the target brightness value, when the preset direction is configured to indicate decreasing the screen brightness.

In the implementation of the present disclosure, after the second inquiring sub-unit 508 inquires the brightness value corresponding to the difference between the maximum touch strength and the minimum touch strength of the slide operation, and when the preset direction is configured to indicate decreasing the screen brightness, the first determining sub-unit 510 can calculate the absolute value of the difference between the preset default screen brightness value and the brightness value, and use the absolute value as the target brightness value.

The controlling unit 504 is further configured to control the screen to switch from the black screen state to a bright screen state in which the screen brightness is the target brightness value.

In the implementation of the present disclosure, after the first determining sub-unit 510 determines the target brightness value, the controlling unit 504 can control the screen to switch from the black screen state to the bright screen state in which the screen brightness is the target brightness value rather than a preset default brightness value, so as to meet the individual needs of users and improve the user experience.

Referring to FIG. 8, FIG. 8 is a structural schematic diagram illustrating another user terminal of a fourth apparatus implementation of the present disclosure. The user terminal illustrated in FIG. 8 is optimized according to the user terminal illustrated in FIG. 5. Compared with the user terminal illustrated in FIG. 5, the user terminal 500 illustrated in FIG. 8 can include an obtaining sub-unit 512 (such as a logic circuit), a third inquiring sub-unit 514 (such as a processor), a third judging unit 528 (such as a processor), and a second determining unit 516 (such as a processor) in addition to all units of the user terminal illustrated in FIG. 5. The detecting unit 502 and the controlling unit 504 have been described with reference to FIG. 5 and will not be repeated here. The preset duration, the preset strength range and a correspondence relationship between battery power and brightness can be stored in a memory 518 as illustrated in FIG. 8. The touch operation can be detected by a sensor 520 as illustrated in FIG. 8.

The obtaining sub-unit 512 is configured to obtain current battery power of the user terminal it is judged that the duration of the touch operation is greater than the preset duration and the touch strength of the touch operation falls within the preset strength range.

In the implementation of the present disclosure, when it is judged that the duration of the touch operation is greater than the preset duration and the touch strength of the touch operation falls within the preset strength range, the obtaining sub-unit 512 can obtain the current battery power of the user terminal via a built-in battery detecting unit.

The third inquiring sub-unit 514 is configured to inquire a target brightness value corresponding to the current battery power according to a pre-stored correspondence relationship between battery power and brightness.

In the implementation of the present disclosure, the higher the screen brightness of the user terminal, the faster the battery power consumption, the shorter the standby time. The user terminal can obtain the correspondence relationship between battery power and brightness in advance through experiments, and store the correspondence relationship in the user terminal. After the obtaining sub-unit 512 obtains the current battery power of the user terminal, the third inquiring sub-unit 514 can inquire the target brightness value corresponding to the current battery power according to the pre-stored correspondence relationship between battery power and brightness. In the correspondence relationship, the battery power corresponds to the brightness, and each brightness can ensure that a battery power corresponding thereto does not affect the user to watch while maintaining a long standby time. For example, battery power A1 corresponds to brightness B1, and when the battery power of the user terminal is A1, the screen brightness of the user terminal can be adjusted to B1, to avoid affecting the user watch and maintain a long standby time with the brightness B1.

The controlling unit 504 is further configured to control the screen to switch from the black screen state to a bright screen state in which the screen brightness is the target brightness value.

In the implementation of the present disclosure, the controlling unit 504 can control the screen to switch from the black screen state to the bright screen state in which the screen brightness is the target brightness value, so as to save as much battery power as possible and maintain a long standby time with the screen brightness of the target brightness value.

The second determining unit 516 is configured to determine a focus point of eyeballs of a user according to obtained activity information of the eyeballs of the user, after the detecting unit 502 detects the touch operation on the screen in the black screen state.

In the implementation of the present disclosure, the second determining unit 516 can obtain the activity information of the eyeballs of the user by eye-tracking technology, so as to determine a target of the eyeballs, that is, the focus point. Specifically, low-power infrared beam can be configured to irradiate the eyeballs of the user, then light reflected from the pupil, the iris, the cornea, or other different parts can be acquired by sensors, and after analysis of a preset algorithm, the target of the eyeballs watch can be determined.

Preset Condition 2

In some possible implementations, the preset condition 2 can be as follows: there is on the screen a target point matching with the focus point, a location of a touch point of the touch operation belongs to a preset area, a duration of the touch operation is greater than a preset duration, and touch strength of the touch operation falls within a preset strength range.

The terminal 500 can further include the third judging unit 528 (such as a processor).

The third judging unit 528 is configured to judge whether or not on the screen there is a target point matching with the focus point.

The first judging unit 522 is further configured to judge whether or not the location of the touch point of the touch operation belongs to the preset area, when the third judging unit 528 judges that there is on the screen the target point matching with the focus point.

In the implementation of the present disclosure, the manner in which it is judged whether or not there is on the screen the target point matching with the focus point can include the follows.

It is judged that whether or not there is on the screen such a point, from which the distance to the focus point is less than or equivalent to a preset distance threshold. If YES, it can be judged that on the screen, there is the target point matching with the focus point.

In the implementation of the present disclosure, when eyes of the user are looking at a distance, the distance from the focus point of the eyeballs of the user to any point on the screen can be larger than the preset distance threshold. At this moment, the user does not pay attention to the screen of the user terminal, that is, touching operation of the user on the screen may be a misoperation. The user terminal does not need to light the screen, so as to save battery power of the user terminal.

When it is judged that there is the target point on the screen matching with the focus point, it can be further judged that whether or not the location of the touch point of the touch operation belongs to the preset area, then if YES, it can be judged that whether or not a duration of the touch operation is greater than a preset duration and touch strength of the touch operation falls within a preset strength range.

As can be seen from the user terminal illustrated in FIG. 5-FIG. 8, in the black screen state, the detecting unit 502 detects the touch operation on the screen. When the preset condition is met, the controlling unit 504 can control the screen to switch from the black screen state to the bright screen state. As can be seen, by means of the implementation of the present disclosure, the controlling unit 504 can determine whether or not it is needed to control the screen to switch from the black screen state to the bright screen state according to touch information (at least one of touch location, touch event, and touch strength) of the touch operation of the user. There is no need for users to spend more time finding a power button and press the power button for several times, thus can improve the efficiency of controlling the lighting of the screen.

Figure 9:
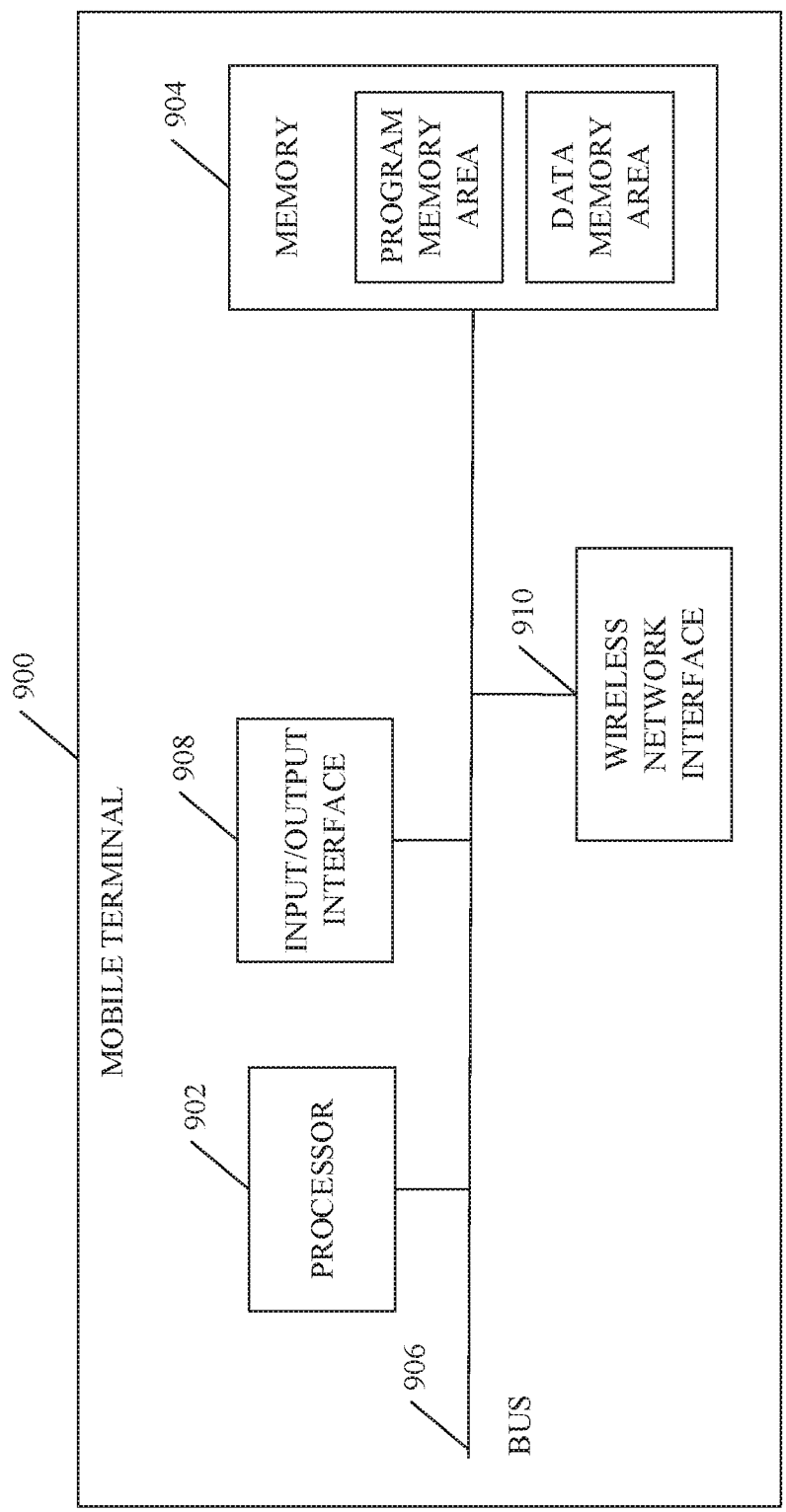
FIG. 9 is a structural schematic diagram illustrating another user terminal of a fifth apparatus implementation of the present disclosure.

Referring to FIG. 9, FIG. 9 is a structural schematic diagram illustrating a user terminal of a fifth apparatus implementation of the present disclosure. The user terminal includes a processor 902 and a memory 904, and the processor 902 is connected with the memory 904 via a BUS 906. The memory 904 can be a high-speed RAM or a non-volatile memory, such as at least one disk memories. In some possible implementations, the memory 904 can further be at least one storing devices depart from the processor 902. The processor 902 is configured to call application programs stored in the memory 904 to conduct the following operations. Besides, the user terminal can further include an input/output interface 908 for communication with external equipment and a wireless network interface 910 for accessing a network. The processor 902, the memory 904, the input/output interface 908, and the wireless network interface 910 can be interconnected via the BUS 906.

The processor 902 detects a touch operation on a screen in a black screen state. When a preset condition is met, the processor 902 controls the screen to switch from the black screen state to a bright screen state.

Specifically, the processor 902 judges whether or not a location of a touch point of the touch operation belongs to a preset area. If YES, the processor 902 judges whether or not a duration of the touch operation is greater than a preset duration and whether or not touch strength of the touch operation falls within a preset strength range. The processor 902 controls the screen to switch from the black screen state to a bright screen state, when the duration of the touch operation is greater than the preset duration and the touch strength of the touch operation falls within the preset strength range.

In some possible implementations, the processor 902 is further configured to call the application programs stored in the memory 904 to conduct the following operations after the processor 902 judges that the duration of the touch operation is greater than the preset duration and the touch strength of the touch operation falls within the preset strength range.

The processor 902 inquires a target brightness value corresponding to the average touch strength of the slide operation according to a pre-stored correspondence relationship between strength and brightness when it is detected that the slide operation that slides towards the preset direction with the location of the touch point as the starting location is performed on the screen.

The processor 902 configured to control the screen to switch from the black screen state to the bright screen state is further configured to control the screen to switch from the black screen state to a bright screen state in which the screen brightness is the target brightness value.

In some possible implementations, the processor 902 is further configured to call the application programs stored in the memory 904 to conduct the following operations after the processor 902 judges that the duration of the touch operation is greater than the preset duration and the touch strength of the touch operation falls within the preset strength range.

The processor 902 inquires a brightness value corresponding to the difference between the maximum touch strength and the minimum touch strength of the slide operation according to a pre-stored correspondence relationship between strength and brightness value when it is detected that the slide operation that slides towards the preset direction with the location of the touch point as the starting location is performed on the screen. The processor 902 sums a preset default screen brightness value and the brightness value, and uses the summed brightness value as a target brightness value, when the preset direction is configured to indicate increasing screen brightness.

The processor 902 configured to control the screen to switch from the black screen state to the bright screen state is further configured to control the screen to switch from the black screen state to a bright screen state in which the screen brightness is the target brightness value.

The processor 902 is further configured to call the application programs stored in the memory 904 to conduct the following operations.

The processor 902 calculates the absolute value of the difference between the preset default screen brightness value and the brightness value, and uses the absolute value as a target brightness value, when the preset direction is configured to indicate decreasing the screen brightness.

The processor 902 configured to control the screen to switch from the black screen state to the bright screen state is further configured to control the screen to switch from the black screen state to a bright screen state in which the screen brightness is the target brightness value.

In some possible implementations, the processor 902 is further configured to call the application programs stored in the memory 904 to conduct the following operations after the processor 902 judges that the duration of the touch operation is greater than the preset duration and the touch strength of the touch operation falls within the preset strength range.

The processor 902 obtains current battery power of the user terminal. The processor 902 inquires a target brightness value corresponding to the current battery power according to a pre-stored correspondence relationship between battery power and brightness.

The processor 902 configured to control the screen to switch from the black screen state to the bright screen state is further configured to control the screen to switch from the black screen state to a bright screen state in which the screen brightness is the target brightness value.

In some possible implementations, the processor 902 is further configured to call the application programs stored in the memory 904 to conduct the following operations after the processor 902 detects the touch operation on the screen in the black screen state, before the processor 902 determines whether or not the location of the touch point of the touch operation belongs to the preset area.

The processor 902 determines a focus point of eyeballs of a user according to obtained activity information of the eyeballs of the user.

Preset Condition 2

In some possible implementations, the preset condition 2 can be as follows: there is on the screen a target point matching with the focus point, a location of a touch point of the touch operation belongs to a preset area, a duration of the touch operation is greater than a preset duration, and touch strength of the touch operation falls within a preset strength range.

Specifically, the processor 902 judges whether or not there is on the screen a target point matching with the focus point. If YES, the processor 902 conducts the process of judging whether or not the location of the touch point of the touch operation belongs to the preset area.

It should be noted that, for simple description, each of the foregoing method implementation is expressed as a series of action combinations. However, it will be appreciated by those skilled in the art that, the present disclosure is not limited by a described action sequence. That is because some steps may be executed in other sequences or simultaneously according to the present disclosure. Also, it will be appreciated by those skilled in the art that, the implementations described in the description fall within exemplary implementations, and actions and modules involved may not be necessary for the present disclosure.

In the foregoing implementations, descriptions of each implementation are emphasized respectively, and parts which are not elaborated in a certain implementation may subject to relevant descriptions of other implementations.

It will be understood by those of ordinary skill in the art that, implementation of all or part of the processes in the method of the implementations described above can be accomplished by a computer program to instruct the associated hardware; the computer program can be stored in a computer-readable storage medium. The storage medium can be a flash disk, a read-only memory (ROM), a random access memory (RAM), a magnetic disk, an optical disk, or the like.

While the method for controlling a screen of a user terminal and the user terminal provided in the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for controlling a screen of a user terminal, comprising:

detecting, by a built-in pressure sensor of the user terminal, a touch operation on a screen in a black screen state, wherein the backlight of the screen is powered off in the black screen state and the user terminal is standby for use in the black screen state:

judging, by the user terminal, whether or not a location of a touch point of the touch operation belongs to a preset area;

when YES, judging, by the user terminal, whether or not a duration of the touch operation is greater than a preset duration and whether or not a touch strength of the touch operation falls within a preset strength range;

detecting, by the user terminal, whether or not a slide operation that slides towards a preset direction with the location of the touch point as a starting location is performed on the screen, when the duration of the touch operation is greater than the preset duration and the touch strength of the touch operation falls within the preset strength range;

when YES, inquiring, by the user terminal, a target brightness value corresponding to an average touch strength of the slide operation according to a pre-stored correspondence relationship between strength and brightness; or inquiring, by the user terminal, a brightness value corresponding to a difference between the maximum touch strength and the minimum touch strength of the slide operation according to a pre-stored correspondence relationship between the strength and the brightness;

summing, by the user terminal, a preset default screen brightness value and the brightness value, and using the summed brightness value as a target brightness value, when the preset direction is configured to indicate increasing the screen brightness;

calculating, by the user terminal, the absolute value of the difference between the preset default screen brightness value and the brightness value, and using the absolute value as a target brightness value, when the preset direction is configured to indicate decreasing the screen brightness; or obtaining, by the user terminal, current battery power of the user terminal;

inquiring, by the user terminal, a target brightness value corresponding to the current battery power according to a pre-stored correspondence relationship between battery power and brightness; and controlling, by the user terminal, the screen to switch from the black screen state to a bright screen state in which the screen brightness is the target brightness value, wherein the user terminal is operable for use in the bright screen state.

2. The method of claim 1, further comprising, after detecting the touch operation on the screen in the black screen state and before judging whether or not the location of the touch point of the touch operation belongs to the preset area:
- determining a focus point of eyeballs of a user according to obtained activity information of the eyeballs of the user;
- judging whether or not there is on the screen a target point matching with the focus point; and
- when YES, conducting the process of judging whether or not the location of the touch point of the touch operation belongs to the preset area.

3. The method of claim 2, wherein judging whether or not there is on the screen a target point matching with the focus point comprises:
- judging whether or not there is on the screen such a point, from which the distance to the focus point is less than or equivalent to a preset distance threshold; and
- when YES, determining that there is on the screen the target point matching with the focus point.

4. A user terminal, comprising:
- a built-in pressure sensor;
- a memory configured to store program codes; and
- at least one processor configured to execute the program codes stored in the memory to:
  - detect, using the built-in pressure sensor, a touch operation on a screen in a black screen state, wherein the backlight of the screen is powered off in the black screen state and the user terminal is standby for use in the black screen state;
  - judge whether or not a location of a touch point of the touch operation belongs to a preset area;
  - judge whether or not a duration of the touch operation is greater than a preset duration and whether or not touch strength of the touch operation falls within a preset strength range, when judging that the location of the touch point of the touch operation belongs to the preset area;
  - detect whether or not a slide operation that slides towards a preset direction with the location of the touch point as a starting location is performed on the screen, after judging that the duration of the touch operation is greater than the preset duration and the touch strength of the touch operation falls within the preset strength range;
  - inquire a target brightness value corresponding to an average touch strength of the slide operation according to a pre-stored correspondence relationship between strength and brightness, when detecting that the slide operation that slides towards the preset direction with the location of the touch point as the starting location is performed on the screen; or, inquire a brightness value corresponding to a difference between the maximum touch strength and the minimum touch strength of the slide operation according to a pre-stored correspondence relationship between strength and brightness;
  - sum a preset default screen brightness value and the brightness value, and use the summed brightness value as a target brightness value, when the preset direction is configured to indicate increasing screen brightness;
  - calculate the absolute value of the difference between the preset default screen brightness value and the brightness value, and use the absolute value as a target brightness value, when the preset direction is configured to indicate decreasing the screen brightness; or, obtain current battery power of the user terminal; inquire a target brightness value corresponding to the current battery power according to a pre-stored correspondence relationship between battery power and brightness; and
  - control the screen to switch from the black screen state to a bright screen state in which the screen brightness is the target brightness value, wherein the user terminal is operable for use in the bright screen state.

5. The user terminal of claim 4, wherein the program codes stored in the memory are further configured to:
- determine a focus point of eyeballs of a user according to obtained activity information of the eyeballs of the user, after detecting the touch operation on the screen in the black screen state and before judging whether or not the location of the touch point of the touch operation belongs to the preset area;
- judge whether or not on the screen there is a target point matching with the focus point; and
- judge whether or not the location of the touch point of the touch operation belongs to the preset area, when judging that there is on the screen the target point matching with the focus point.

6. The user terminal of claim 5, wherein the program codes stored in the memory are further configured to:
- judge whether or not there is on the screen such a point, from which the distance to the focus point is less than or equivalent to a preset distance threshold; and
- when YES, determine that there is on the screen the target point matching with the focus point.

* * * * *